3,556,982
COMBINATION ADDITIVE FOR TAR SAND PROCESSING

Victor P. Kaminsky and Clement W. Bowman, Edmonton, Alberta, Canada, assignors of thirty percent each to Cities Service Athabasca, Inc., a corporation of Delaware, Imperial Oil Limited, a corporation of Canada, and Atlantic Richfield Corporation, a corporation of Pennsylvania, and ten percent to Royalite Oil Company, Limited, a corporation of Canada
No Drawing. Filed June 26, 1968, Ser. No. 740,016
Int. Cl. C10g 1/04
U.S. Cl. 208—11                                      6 Claims

ABSTRACT OF THE DISCLOSURE

A tar sand additive is disclosed which comprises a mixture of sodium hydroxide and sodium tripolyphosphate. The additive is especially useful in a process for recovering bitumen from bituminous sands by aqueous extraction, when the sodium tripolyphosphate and the sodium hydroxide are each present in amounts from about 0.005 to 0.1% by weight and in which the weight ratio of parts sodium hydroxide per part sodium tripolyphosphate is from about 5:1 to 1:5.

BACKGROUND OF THE INVENTION

(I) Field of the invention

This invention relates to a novel additive mixture designed to improve processability of a bituminous froth recovered in a tar sand extraction process. In particular, it relates to an additive mixture capable of reducing water and sand content of a bituminous froth produced in a tar sand extraction process.

(II) Description of the prior art

Large deposits of bituminous sand are found in various localities throughout the world. The term "bituminous sand" is used herein to include those materials commonly referred to as oil sand, tar sand, and the like. One of the most extensive deposits of bituminous sand occurs, for instance, in the Athabasca District of the Province of Alberta, Canada. Typically, the sands contain from about 6% to about 20% bitumen, from about 1% to about 10% of water, and from about 70% to about 90% of mineral solids.

The major portion, by weight, of the mineral solid in bituminous sand is quartz sand having a particle size greater than about 45 microns and less than 2,000 microns. The term "mineral" is used herein to describe material of inorganic origin such as sand, clay, and the like and is distinguished from material of organic origin such as coke. For the most part, the remaining mineral solid material has a particle size of less than about 45 microns. This small sized mineral solid material is referred to as "fines." The fines contain clay and silt, including some very small particles of sand. The fines content typically varies from about 5% to about 30% by weight of total mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry of bituminous sand. The coarse sand and portions of the fines are separated from the slurry by various means, such as settling in a body of water. A bituminous "emulsion" or "froth" containing the desired bitumen along with some water and sand is extracted from the major portion of water and sand in the slurry.

One well-known method for preparing such an emulsion is often referred to as the "hot-water process." In the hot-water process, bituminous sand is slurried with steam and hot water and the pulp is then agitated with a stream of circulated hot water and carried to a separation cell maintained at an elevated temperature. In the separation cell, entrained air causes the bitumen to rise to the top of the cell in the form of an emulsion containing air, bitumen, water and mineral solids.

Separation of water and mineral solids from the bituminous emulsion is thereafter necessary to concentrate the bitumen. A number of methods have been proposed for processing bituminous emulsions and recovering bitumen, among them thermal dehydration to remove water followed by cycloning, filtering, or settling to remove mineral solids.

Unfortunately, the mineral solids are extremely difficult to separate from the bitumen and, unless the emulsion is further treated, the final bitumen product will generally contain at least about 10% mineral solids.

In an effort to upgrade the quality of bituminous emulsion (froth) produced by conventional water extraction processes in order to facilitate further processing of the emulsion into a bitumen product, it has been proposed to adjust the pH of the extraction process to an alkaline region in order to keep the sand "wet" and more readily separable from the bitumen. At an alkaline pH both the sand and bitumen in the froth possess identical charges and, as a result, resist agglomeration.

Addition of strong bases such as sodium hydroxide to adjust pH and improve processability of the froth have proven largely unsatisfactory. Although the pH of the process is readily adjusted to an alkaline range, the solids and the water content of the bituminous emulsion recovered have not been significantly decreased. Further, in certain cases, yields of oil recovered from the froth has declined.

SUMMARY OF THE INVENTION

A principal object of this invention is to provide an improved additive which is relatively free of the aforementioned disadvantages of the prior art for improving the processability of the bituminous emulsion produced in a bituminous sand extraction system.

It is another object of this invention to provide a tar sand additive with improved wetting action which can be employed at a moderately alkaline pH.

It is a further object of this invention to provide an improved tar sand extraction process yielding a bituminous froth having reduced quantities of water and mineral solids.

Other objects, advantages, and aspects will become evident as the discussion proceeds.

The objects of this invention are met by a tar sand additive comprising a mixture of sodium tripolyphosphate and sodium hydroxide. The novel additive mixture may be employed in any water extraction process applicable to bituminous sands.

In another aspect of this invention, unexpected enhancement of the properties of a bituminous emulsion is obtained in a process for extracting bitumen from bituminous sand in which bituminous sands are slurried with a fluid, the slurry is introduced into a separation zone containing a body of water, bitumen is floated to the top of such a body of water, a bituminous froth is recovered therefrom, and the froth is processed to extract bitumen, when an additive comprising a mixture of sodium hydroxide and sodium tripolyphosphate is introduced into the process. Surprisingly, it has been found that when sufficient quantities of the novel additive mixture are introduced into a bituminous sand extraction process to adjust the pH of the process to between about 9 and 10, an unexpectedly large reduction in the water and solids content of the froth is noted without a corresponding adverse effect upon the quantity of oil recovered therefrom.

Reductions of about 50% of the solids and about 35% of the water normally present in a froth separated out in an untreated tar sand extraction process are readily achievable. As a result, bitumen is more easily processed from the separated froth.

Also, the separability of bitumen from a bituminous froth produced from low grade tar sands by aqueous extraction is also enhanced by introducing the novel additive in accordance with the invention. Further enhanced results in froth quality (reduced sand and water content) are obtained when the novel additive is employed in an extraction process for tar sands having a high concentration of fines.

DESCRIPTION OF PREFERRED EMBODIMENTS

While the individual constituents of the novel additive mixture may be employed in any proportion which produces a significant improvement in the solids and water content of the bituminous froth, it is generally preferred that the weight ratio of parts sodium tripolyphosphate per part sodium hydroxide is from about 5:1 to 1:5. Further enhanced results are obtained when the ratio is from about 2:1 to 1:1.

It has been found that when the pH is adjusted from about 9 to 9.5, the quantity of oil recovered from the bituminous process is optimized. Generally, when the pH is adjusted to from about 9.5 to 10, the quality of the froth recovered is optimized. Accordingly, in order to enhance recovery of oil and also to improve froth quality, generally sufficient quantities of the novel additive are introduced to adjust the pH to between about 9 and 10 and preferably from about 9.3 to 9.7.

For these and other purposes, the sodium hydroxide and sodium tripolyphosphate are each employed in amounts from about 0.005 to 0.1% by weight based on the weight of tar sand employed.

Generally, if amounts greater than about 0.1% by weight of either of the substituents is employed, oil yields recovered from a bituminous emulsion are unsatisfactory and, generally, the processability of the bituminous emulsion is adversely effected. If less than about 0.005% by weight of either of the substituents of the additive mixture is employed, some improvement in the processability of the froth is noted, however, the pH of the process will normally be below the desired range and oil yields are diminished.

It is preferable to employ from about 0.02 to 0.05% by weight of each of the substituents of the novel additive mix in the process.

Generally, it is preferable to introduce the novel additive mix into the process as early as possible. Preferably, the mix is introduced during initial slurrying of the tar sands. The additive may be employed in batch processing or continuous processing of tar sands.

The following examples are given to further illustrate the nature of the invention and are not limitative of scope.

EXAMPLE I

In order to demonstrate the effectiveness of the novel additive of this invention, batches of tar sand analyzing 11.63% by weight of bitumen, 4.26% by weight water, and 84.11% by weight mineral solids were extracted for bitumen according to the following procedure:

Raw tar sand is slurried in a semi-continuous process with sufficient water to produce a bituminous slurry having about 25% by weight water. The slurry is agitated at about 130 r.p.m. and thereafter additional water is added to the slurry at the rate sufficient to produce a slurry having a water content of about 45 weight percent.

This flooded bituminous slurry is then introduced into a separation zone where it is aerated by means of an impeller operating at a peripheral velocity of about 500 feet per minute. The aerated oil particles rise to the surface where they are skimmed off. The remaining solids and water are pumped out of the bottom of the separation zone at a rate sufficient to maintain a constant froth level.

The froth is processed according to conventional procedures to recover bitumen and a portion of the froth is analyzed for solids, water and bitumen content. The novel additive is introduced into the system during initial slurrying of the raw tar sands.

The quantity of solids in the froth recovered is expressed in terms of a ratio of the quantity of solids over the quantity of oil in the froth, multiplied by a hundred. Similarly, the quantity of water in the froth is expressed in terms of the ratio of the quantity of water to the quantity of oil in the froth multiplied by a hundred. Results of the batch testing are set forth in the table below.

EFFECT OF VARYING PROPORTIONS OF THE ADDITIVE MIX IN TAR SAND EXTRACTION PROCESS

| Total percent weight of additive mix | Weight of sodium tripolyphosphate to sodium hydroxide | Analysis of froth | | |
|---|---|---|---|---|
| | | Solids/oil | Water/oil | Percent oil recovered |
| 0.12 | 5:1 | 5.3 | 16.3 | 86.7 |
| 0.07 | 2:1 | 5.9 | 16.0 | 91.6 |
| 0.05 | 1:1 | 6.0 | 17.0 | 89.0 |
| 0.06 | 1:5 | 6.8 | 19.1 | 92.2 |
| Blank run | | 10.1 | 25.2 | 88.5 |

The last run was a blank in which no additive was added but all other conditions were kept identical to the previous runs. The total weight percent of additive is based on the total weight of sodium hydroxide and sodium tripolyphosphate added and the weight of raw tar sands employed.

The percent oil recovered is based on the quantity of oil extracted from the bituminous froth compared to the total weight of oil present in the froth.

The results demonstrate that in order to decrease the quantity of solids and water in the froth without adversely effecting the quantity of oil recovered, one can readily employ the novel additive mix wherein the weight ratio of sodium tripolyphosphate to sodium hydroxide of from about 5 to 1 to 1 to 5. As the table illustrates, the proportions of substituents may be varied within this suitable range with significant improvements in quantity of oil recovered and/or properties of the froth.

EXAMPLE II

In order to demonstrate the effect of varying the concentration of additive mix in a tar sand extraction process, tar sand was extracted according to the procedure of Example I with varying concentrations of additive employed. Results of these tests are reported in the table below.

| Run | Dosage [1] | | pH of the system | Froth analysis X100 | | Percent oil recovered |
|---|---|---|---|---|---|---|
| | Sodium tripolyphosphate | Sodium hydroxide | | Solids/oil | Water/oil | |
| 1 | 0.01 | 0.05 | 9.6 | 6.8 | 19.1 | 92.2 |
| 2 | 0.025 | 0.02 | 9.5 | 6.5 | 18.1 | 89.9 |
| 3 | 0.05 | 0.02 | 9.4 | 5.9 | 16.0 | 91.6 |
| 4 | 0.10 | 0.03 | 10.0 | 5.5 | 16.2 | 85.4 |
| 5 | 0.20 | 0.05 | 10.1 | 6.9 | 15.8 | 34.8 |
| 6 | 0.50 | 0.05 | 10.1 | 9.6 | 30.1 | 9.8 |

[1] Weight percent based on total raw tar sand.

As is demonstrated by the results in the above table, the concentration of each of the substituents in the additive mix may be suitably varied. Enhanced results, generally, are observed when the concentrations of each of the substituents is from about 0.005 to 0.1% by weight and preferably from 0.02 to 0.05% by weight, based on the total raw tar sands.

EXAMPLE III

In order to demonstrate the unexpected improvement in processability of the froth when the novel additive mixture is employed as contrasted with the results achieved when the individual components were employed, comparative runs were conducted according to the procedure of Example I. Results of these experiments are reported in the table below.

UNEXPECTED EFFECTS OF ADDITIVE AS COMPARED TO INDIVIDUAL COMPONENTS

| Run | Dosage [1] | | Froth | | Percent oil recovered |
|---|---|---|---|---|---|
| | Sodium tripoly-phosphate | Sodium hydroxide | ×100 Solids/oil | Water/oil | |
| 1 | 0.05 | None | 7.7 | 21.4 | 89.4 |
| 2 | None | 0.05 | 9.2 | 21.0 | 90.7 |
| 3 | 0.025 | 0.02 | 6.5 | 18.1 | 89.9 |

[1] Weight percent based on total raw tar sand.

The results of this table demonstrate that when a mixture of sodium tripolyphosphate and sodium hydroxide is employed in a tar sand extraction process, the processability of the bituminous froth recovered is enhanced to an unexpected extent.

It will be understood that the specific embodiments set forth hereinabove are illustrative only and that the invention is not to be limited except as set forth in the following claims.

Therefore, we claim:

1. In a process for extracting bitumen from bituminous sand in which bituminous sands are slurried with a fluid, the slurry is introduced into a separation zone containing a body of water, bitumen is floated to the top of such body of water, and a bituminous froth is recovered therefrom, the improvement comprising introducing a mixture of sodium hydroxide and sodium tripolyphosphate into the process.

2. The process of claim 1 in which the sodium hydroxide and sodium tripolyphosphate are each present in amounts from 0.005 to 0.1% by weight based on the weight of bituminous sand employed.

3. The process of claim 2 in which the sodium hydroxide and the sodium triploy phosphate are each present in amounts from about 0.02 to 0.05% by weight.

4. The process of claim 1 in which the weight ratio of parts sodium hydroxide per part sodium tripolyphosphate employed is from about 5:1 to 1:5.

5. In a process for extracting bitumen from bituminous sand in which bituminous sands are slurried with water, the slurry is introduced into a separation zone containing a body of water, bitumen is floated to the top of such body of water, a bituminous froth is recovered therefrom, and the froth is processed to extract bitumen, the improvement comprising introducing a mixture of sodium hydroxide and sodium tripolyphosphate into the process during slurrying, wherein the weight ratio of parts sodium hydroxide per part sodium tripolyphosphate employed is from about 5:1 to 1:5, and wherein the sodium hydroxide and sodium tripolyphosphate are each present in amounts from about 0.005 to 0.1% by weight based on weight of bituminous sand.

6. The process of claim 5 in which the weight ratio of parts sodium tripolyphosphate per part sodium hydroxide employed is from about 2:1 to 1:1 and the sodium hydroxide and sodium tripolyphosphate are each present in amounts from about 0.02 to 0.05% by weight.

References Cited

UNITED STATES PATENTS

| 3,330,757 | 7/1967 | Bichard | 208—11 |
| 3,422,000 | 1/1969 | Bichard | 208—11 |
| 3,441,511 | 4/1969 | Otrahalek | 252—135 |

CURTIS R. DAVIS, Primary Examiner

U.S. Cl. X.R.

252—135